May 31, 1927.

M. A. HUHNHOLZ 1,630,342

HOOD CONSTRUCTION

Filed Feb. 23, 1922

Witness
John E. Titus

Inventor
Max A. Huhnholz
Brown, Bortteuer, Dienner
Attorneys

May 31, 1927. 1,630,342

M. A. HUHNHOLZ

HOOD CONSTRUCTION

Filed Feb. 23, 1922  2 Sheets-Sheet 2

Inventor
Max A. Huhnholz
Brown, Boettcher & Denner
Attorneys

Witness
John E. Titus

Patented May 31, 1927.

1,630,342

UNITED STATES PATENT OFFICE.

MAX A. HUHNHOLZ, OF CHICAGO, ILLINOIS.

HOOD CONSTRUCTION.

Application filed February 23, 1922. Serial No. 538,506.

My invention relates to motor vehicle construction, and more particularly to the hood surrounding the motor and forming part of the body of the vehicle. While the particular hood illustrated is intended for use on a motor vehicle, it will be apparent from the following description that many features of my invention are not limited to use in connection with a hood employed solely on motor vehicles.

It is desired particularly, in motor vehicle construction, to protect the exterior finish of the hood from the heat of the motor, which heat causes burning and ultimately darkening of the finish, or if the finish is of a dark color, removing the lustre or brightness so that it detracts from the general appearance of the vehicle.

So far as I am aware, no steps have been taken to avoid this difficulty except for baking a dark finish under a relatively high temperature, which was slightly greater than the heat developed by the motor. This method is satisfactory in that the original color may be maintained under the heat of the motor, but the lustre is destroyed. Where the finish is of light color, air drying must be resorted to, and, consequently, not only is the lustre lost under the heat of the motor, but the hood soon becomes darkened, causing trouble and expense to the owner of the vehicle.

The object of the present invention is to provide means for overcoming this difficulty, which means may consist in constructing the walls of the hood so that they are insulated against the conduction of heat. By the provision of this means, there is a tendency to maintain the temperature under the hood, by preventing the dissipation of the heat through the hood during the winter time while the car is left standing.

In order to apprise those skilled in the art how to construct and practice my invention, I shall now describe one embodiment thereof in connection with the accompanying drawing; in which, Fig. 1 is a longitudinal vertical section through the front portion of a motor vehicle;

Figure 2:
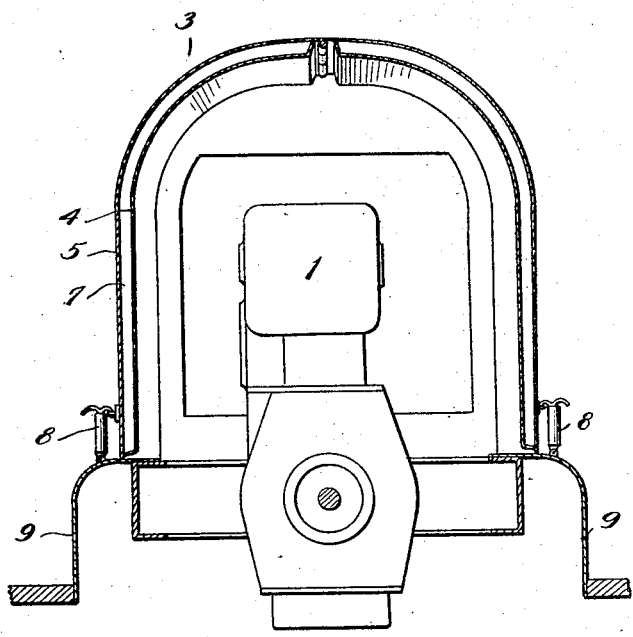
Fig. 2 is a transverse vertical section taken on line 2—2 of Fig. 1.
Figure 3:
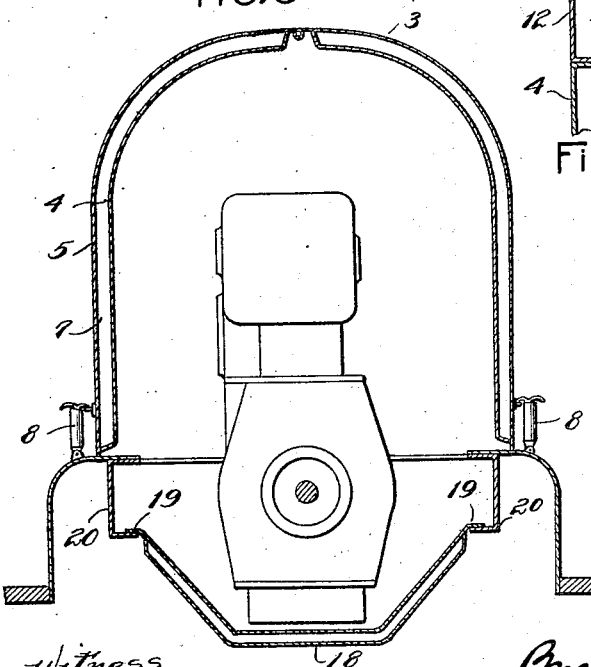
Fig. 3 is a view similar to Fig. 2, illustrating the use of a double wall below the motor.

In the embodiment of my invention selected for illustration, the vehicle is provided with the usual motor 1 disposed in front of the driver's compartment 2. Closing over the motor 1 is the hood 3 which is pivotally carried along the longitudinal center line at the apex of the hood, as shown in Figures 2 and 3. The hood 3 is of the same outward appearance as heretofore. The heat insulating means is disposed on the interior of the hood, although it may be mounted on the outside, if so desired.

The means provided for preventing the conduction of heat through the hood 3 is, in the present case, in form of an inner wall 4 spaced away from the outer wall 5. The inner wall 4 may be conveniently formed by stamping it out of thin sheet metal to the configuration of the outer wall 5, but being disposed on the inner side of this wall, it preferably is made slightly smaller.

The wall 4 is then fastened in place in any suitable manner, as for instance, by welding, riveting, or bolting. As is well known, the dead air space 7 will serve to prevent the heat of the motor from passing from the wall 4 to the wall 5. The hood sections are held closed by the spring clips 8 mounted on the members 9 carrying the usual side running boards.

Figure 1:
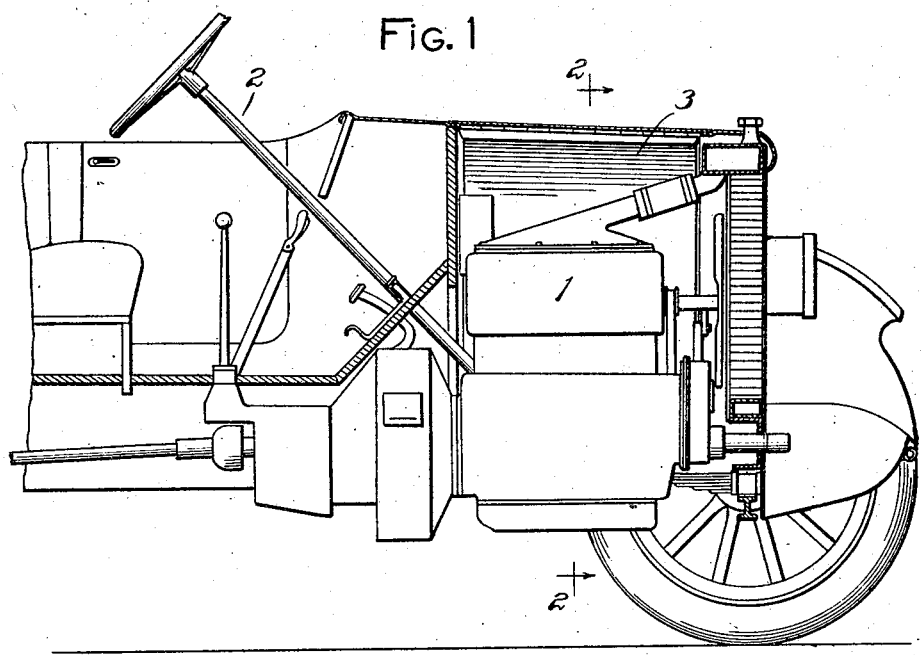
Figure 4:
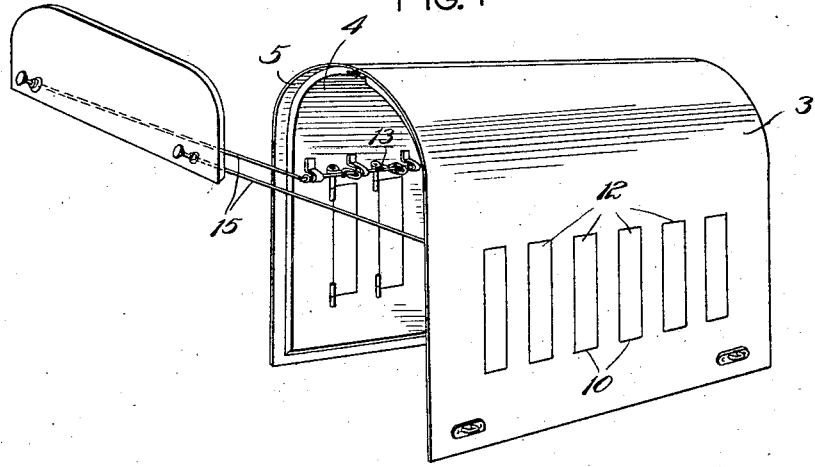
Fig. 4 is an isometric view of the hood and dash board, illustrating the manner of controlling the shutters for the openings in the sides of the hood.
Figure 6:
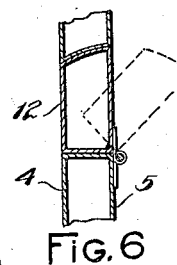
Fig. 6 is a detail sectional view taken horizontally through one of the shutters.
Figure 5:
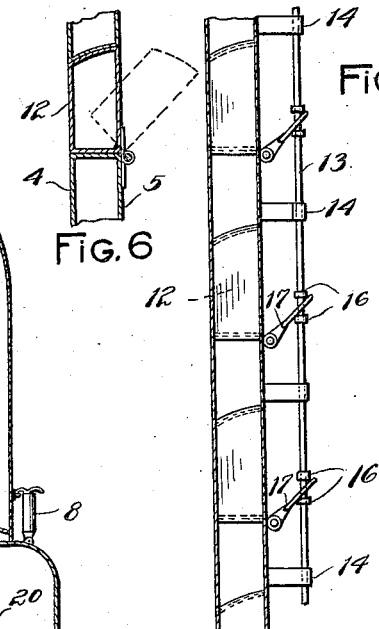
Fig. 5 is a detail sectional view of the hood and shutter controlling mechanism.

As shown in Fig. 4, the hood 3 is provided at its sides with ventilator openings 10. Means for controlling the ventilation thus provided comprises pivotally mounted shutters 12 disposed on the interior of the hood and controlled preferably from the dash board of the vehicle. As shown in Figs. 5 and 6, the shutters 12 are also of double wall construction, and have been arranged to seat within the walls of the hood so as to constitute in reality a continuation thereof. The conduction of heat is as effectively prevented at these points as at other points. Operating rods 13 are provided on the inside of each section of the hood, and at the upper end of the shutters 12. The rods 13 are carried by projecting studs 14 and terminate at their inner ends in any suitable way to form flexible couplings with the dash board connections 15, these couplings allowing disengagement between the rods 13 and connections 15 when the sides of the hoods are raised. Translational motion is imparted to the rods 13 by moving the connections 15 into and out of the dash board. Collars 16 are provided on the rods 13 so that when the latter are shifted, the links 17 will be swung about the hinged point of the shutters 12. Thus the shutters 12 may be easily operated to close the openings 10, or to vary the amount of air circulating there through. It is apparent that the matter of controlling the ventilation for the interior of the hood by means mounted at the sides thereof, may be widely varied. It is not necessary that the shutters have a dead air space between their walls, but this, of course, is highly desirable.

In Fig. 3, it will be seen that I have provided a double wall pan or apron member 18 adapted to be inserted under the motor 1 in such a manner that substantially the entire motor is enclosed by this double wall construction, with the exception of the front and rear ends where the radiator and foot board are located. The member 18 is formed with longitudinal flanges 19, which are supported on the lower horizontal legs of the channel iron 20 of the chassis. This arrangement permits the member 18 to be easily removed when access to the underside of the motor is desirable.

Figure 7:
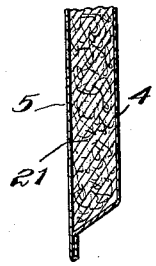
Fig. 7 is an alternative form of hood construction.

In Fig. 7, I have illustrated an alternative embodiment of my invention, employing in lieu of a dead air space between the walls 4 and 5, a layer of asbestos 21, or other suitable heat insulating material.

Figure 8:
Fig. 8 is a view disclosing the use of vacuum between the walls of the hood.

In Fig. 8, I have illustrated a construction employing a partial vacuum between the walls 4 and 5 of the hood. A vacuum is highly effective to prevent transfer of heat but it is very difficult to maintain. Any construction suitable to carry this vacuum may be employed.

It will be apparent from the foregoing description that the gist of the invention is the provision of a hood or other surrounding walls having means for preventing the conduction of heat therethrough, and while I have illustrated a double wall arrangement to accomplish this purpose, it is apparent that there are various ways to procure the same results. However, I have found that spacing the outer wall from the inner wall prevents the heat from reaching the exterior finish of the hood. The use of two walls is advantageous from a constructional standpoint, because of the fact that they are easily assembled, inexpensive to provide, and produce a simple, light and compact hood.

I claim:

1. In an automobile hood construction, the combination of an inner and an outer wall united to prevent the conduction of heat to the exterior surface of the hood whereby the finish thereon may be preserved from the burning action of the heat of the motor, and pivotally mounted shutters also provided with an inner and an outer wall to prevent the conduction of heat to the exterior thereof for preserving the finish thereon, the pivotal mounting of said shutters permitting the shutters to move into and out of said double wall hood whereby the inner and the outer walls of the shutters, when closed, are coplanar with the inner and the outer walls of said hood.

2. In an automobile hood construction, the combination of an inner and outer wall united to prevent the conduction of heat to the exterior surface of the hood whereby the finish thereon may be preserved from the burning action of the heat of the motor, and pivotally mounted shutters also provided with an inner and an outer wall to prevent the conduction of heat to the exterior thereof for preserving the finish thereon, said pivotally mounted shutters each having an arcuate vertical edge to snugly engage a corresponding arcuate seat in said wall whereby the pivotal mounting of said shutters will permit the shutters to move into and out of engagement with said seat in said wall and when closed the inner and outer walls of the shutters are coplanar with the inner and outer walls of said hood.

In witness whereof, I hereunto subscribe my name this 18th day of February, 1922.

MAX A. HUHNHOLZ.